(12) United States Patent
Tsai et al.

(10) Patent No.: US 8,407,168 B2
(45) Date of Patent: Mar. 26, 2013

(54) CODEBOOK GENERATING METHOD

(75) Inventors: Cheng-Fa Tsai, Pingtung (TW);
Yu-Chun Lin, Pingtung County (TW)

(73) Assignee: National Pingtung University of Science & Technology, Neipu Hsiang, Pingtung County (TW)

( * ) Notice: Subject to any disclaimer, the term of this patent is extended or adjusted under 35 U.S.C. 154(b) by 375 days.

(21) Appl. No.: 12/828,617

(22) Filed: Jul. 1, 2010

(65) Prior Publication Data

US 2011/0066580 A1      Mar. 17, 2011

(30) Foreign Application Priority Data

Sep. 14, 2009   (TW) ............................... 98130929 A

(51) Int. Cl.
*G06F 15/18*     (2006.01)
*G06F 13/12*     (2006.01)
(52) U.S. Cl. ........................................... 706/25; 710/68
(58) Field of Classification Search .................. None
See application file for complete search history.

(56) References Cited

U.S. PATENT DOCUMENTS

| | | | |
|---|---|---|---|
| 6,269,333 | B1 | 7/2001 | Ravishankar |
| 6,807,312 | B2 | 10/2004 | Thomas et al. |
| 6,968,092 | B1 | 11/2005 | Winger |

OTHER PUBLICATIONS

Barbalho et al, Hierarchical SOM Applied to Image Compression, 2001.*
Tsai et al, INTSOM: Gray Image Compression Using an Intelligent Self-Organizing Map, Apr. 2009.*
Ordóñez et al, Hierarchical Clustering Analysis with SOM Networks, 2010.*
Tsui et al, EISA: A New Image Compression Using an Expanding-Leaf Segmentation Algorithm, 2009.*
Ontrup et al, Large-scale data exploration with the hierarchically growing hyperbolic SOM, 2006.*

* cited by examiner

*Primary Examiner* — Jeffrey A Gaffin
*Assistant Examiner* — Mikayla Chubb
(74) *Attorney, Agent, or Firm* — Muncy, Geissler, Olds & Lowe, PLLC

(57) ABSTRACT

A codebook generating method includes a dividing and transforming step dividing an original image into original blocks and transforming the original blocks into original vectors; a dividing step grouping the original vectors to obtain centroids; a first layer neuron training step selecting a portion of the centroids as first-level neurons; a grouping step assigning each of the original vectors to a closest first-level neuron so as to obtain groups; a second layer neuron assigning step assigning a number of second-level neurons in each of the groups, and selecting a portion of the original vectors in each of the groups as the second-level neurons; and a second layer neuron training step defining the original vectors in each of the groups as samples, training the second-level neurons in each of the groups to obtain final neurons, and storing vectors corresponding to the final neurons in a codebook.

8 Claims, 8 Drawing Sheets

CODEBOOK GENERATING METHOD

BACKGROUND OF THE INVENTION

1. Field of the Invention

The present invention generally relates to a codebook generating method and, more particularly, to a codebook generating method in use of image compression.

2. Description of the Related Art

In data compression technology, a codebook is usually generated by a codebook generating method when compressing an original image. The codebook has a smaller size than the original image and is thus used to replace the original image for image preservation and transmission. By far, image compression is achieved. On the contrary, during the image decompression, the codebook is decoded by a decoding algorithm to obtain a plurality of reconstructed blocks. The reconstructed blocks are then combined into a reconstructed image. By far, image decompression is achieved.

The conventional codebook generating method usually performs a dividing procedure on an original image to obtain a plurality of original blocks with smaller volume. The original blocks are then converted into a plurality of original vectors by a Vector Quantization mechanism. Finally, a decoding algorithm is used to decode the original vectors to obtain a plurality of code words. The code words have smaller quantity than the original blocks and are representative of the original image. Based on this, the codebook is constructed by the code words.

A conventional decoding algorithm such as a LBG algorithm was proposed by Linda, Buzo and Gray in 1980. The idea of the LBG algorithm is similar to the K-means method known in data clustering methods. In a first step of the LBG algorithm, a value of a distortion index $\epsilon$, as well as a number K for which the original vectors are to be grouped into, are firstly defined. In a second step of the LBG algorithm, K original vectors are randomly selected from the plurality of original vectors and the K selected original vectors are defined as centroids. In a third step of the LBG algorithm, a Euclidean distance between each original vector and centroid is calculated so that each original vector may be assigned to a corresponding centroid. In a fourth step of the LBG algorithm, a central centroid of the original vectors in each group is determined and the determined central centroid is defined as a new centroid. In a fifth step of the LBG algorithm, a difference between the new and the old centroids in each group, namely, the distortion, is calculated. If the calculated distortion is not smaller than the value of the distortion index $\epsilon$, the third step is repeated. If the calculated distortion is smaller than the value of the distortion index $\epsilon$, the whole procedure is terminated. The finally obtained centroids may serve as the code words forming the codebook.

Generally, the aforementioned LBG algorithm is initially performed in a random manner. In addition, the original vectors are in larger number and more complex. Therefore, the obtained result of the LBG algorithm is somewhat unstable.

Another conventional decoding algorithm such as Self-Organizing Map (SOM) is shown in FIG. 1. In a first step of the SOM method, a plurality of pixels of an image is converted into a plurality of input samples 8. In a second step of the SOM method, N neurons 9 are defined and N input samples 8 are randomly selected from the plurality of input samples 8 to be the initial locations of the N neurons 9. In a third step of the SOM method, an input sample 8 is randomly selected from the plurality of input samples 8 in order to calculate a Euclidean distance between the randomly selected input sample 8 and each neuron 9. In a fourth step of the SOM method, the neuron 9 with shortest distance to the randomly selected input sample 8 is defined as a winning neuron 91, with all the neurons 9 located within a circular range centered at the winning neuron 91 with a radius R being defined as neighboring neurons 92. Also in the fourth step of the SOM method, the winning neuron 91 and the neighboring neurons 92 are shifted toward the randomly selected input sample 8 by a distance. In a fifth step of the SOM method, it is determined whether all input samples 8 finish the calculation of Euclidean distance performed in the third step. If not, the procedure goes back to the third step. If so, the whole training procedure is terminated and the radius R is scaled down to initial another round of the training procedure until a predetermined number of times of iteration is satisfied. Thus, a neural network consisting of the N neurons 9 is obtained. Based on this, the N obtained neurons 9 may serve as the codebook in use of image compression.

The above SOMs coding algorithm requires a massive calculations to obtain a desired neural network. In addition, the more the neurons 9 or input samples 8 are, the longer the time is required for calculations. Thus, a lower efficiency is resulted.

Another conventional Fast SOMs coding algorithm improving upon the above SOM method was proposed. The method firstly divides the plurality of input samples 8 into N groups using K-means method, with the number N being equal to the number of the neurons defined in the second step of the above SOM method. Then, locations of the centroids of the N groups are treated as initial locations of the N neurons. Based on this, a preliminary neural network is obtained. In the following processing, the conventional SOM method is used for calculations to reduce the calculation time.

However, the Fast SOMs method is not suitable for processing data in more dimensions as the Fast SOMs method merely processes two dimensional data.

Another conventional hierarchical SOMs (HSOM) coding algorithm was proposed. The main idea of the HSOM method is dividing the calculations of the SOM method into two levels. For example, assume that there are 256 (16×16) neurons defined in the SOM method; in this case, the time complexity is higher. Based on this, the HSOM method firstly performs a first-level training on the input samples using 16 first-level neurons according to the SOM method, and then assigns the plurality of input samples to the 16 first-level neurons in order to obtain 16 groups of input samples. Following, the HSOM method performs a second-level training on all the input samples in each group using 16 second-level neurons according to the SOM method. Based on this, 16 second-level neurons may be obtained from all the input samples in each group. As a result, 256 neurons (16×16) may be obtained, thus reducing the time complexity of the SOM method.

However, since the number of the first-level neurons is the same as that of the second-level neurons in the above HSOM method, the determined result tends to fall in local solution so that the real distribution of the input samples is not easy to obtain. In addition, since each group has different number of input samples but all the groups are trained using the same rather than different number of neurons during the second-level training, the real distribution of the input samples is also not easy to obtain. Thus, a drawback of low efficiency is raised.

Based on the above problems, it is desired to improve the conventional codebook generating method.

SUMMARY OF THE INVENTION

It is therefore the primary objective of this invention to provide a codebook generating method with less time consumption of calculations.

It is another objective of the invention to provide a codebook generating method with high image compression quality.

It is yet another objective of the invention to provide a codebook generating method which avoids the obtained result to fall in local solution.

The invention discloses a codebook generating method comprising a dividing and transforming step dividing an original image into a plurality of original blocks and transforming the original blocks into a plurality of original vectors; a dividing step grouping the original vectors using a grouping algorithm so as to obtain a plurality of centroids; a first layer neuron training step selecting a portion of the centroids as first-level neurons, wherein the centroids are used as samples for training the first-level neurons via a Self-Organizing Map (SOM) method; a grouping step assigning each of the original vectors to a closest first-level neuron so as to obtain a plurality of groups; a second layer neuron assigning step assigning a number of second-level neurons in each of the groups based on a distortion rate of the original vectors in each of the groups, and selecting a portion of the original vectors in each of the groups as the second-level neurons based on the assignment; and a second layer neuron training step defining the original vectors in each of the groups as samples, training the second-level neurons in each of the groups using the SOM method to obtain a plurality of final neurons, and storing vectors corresponding to the final neurons in a codebook.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
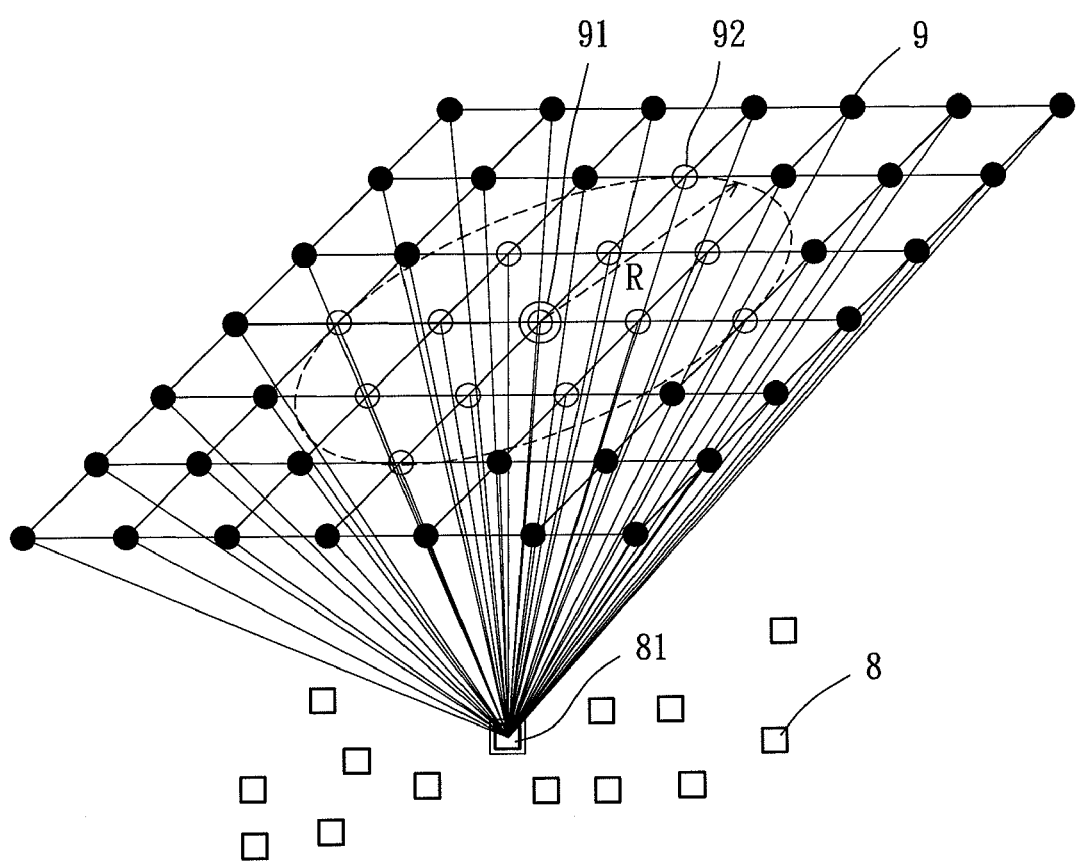
FIG. 1 shows a diagram of a conventional coding algorithm.

In the various figures of the drawings, the same numerals designate the same or similar parts. Furthermore, when the term "first", "second", "third", "fourth", "inner", "outer" "top", "bottom" and similar terms are used hereinafter, it should be understood that these terms are reference only to the structure shown in the drawings as it would appear to a person viewing the drawings and are utilized only to facilitate describing the invention.

DETAILED DESCRIPTION OF THE INVENTION

Figure 2:
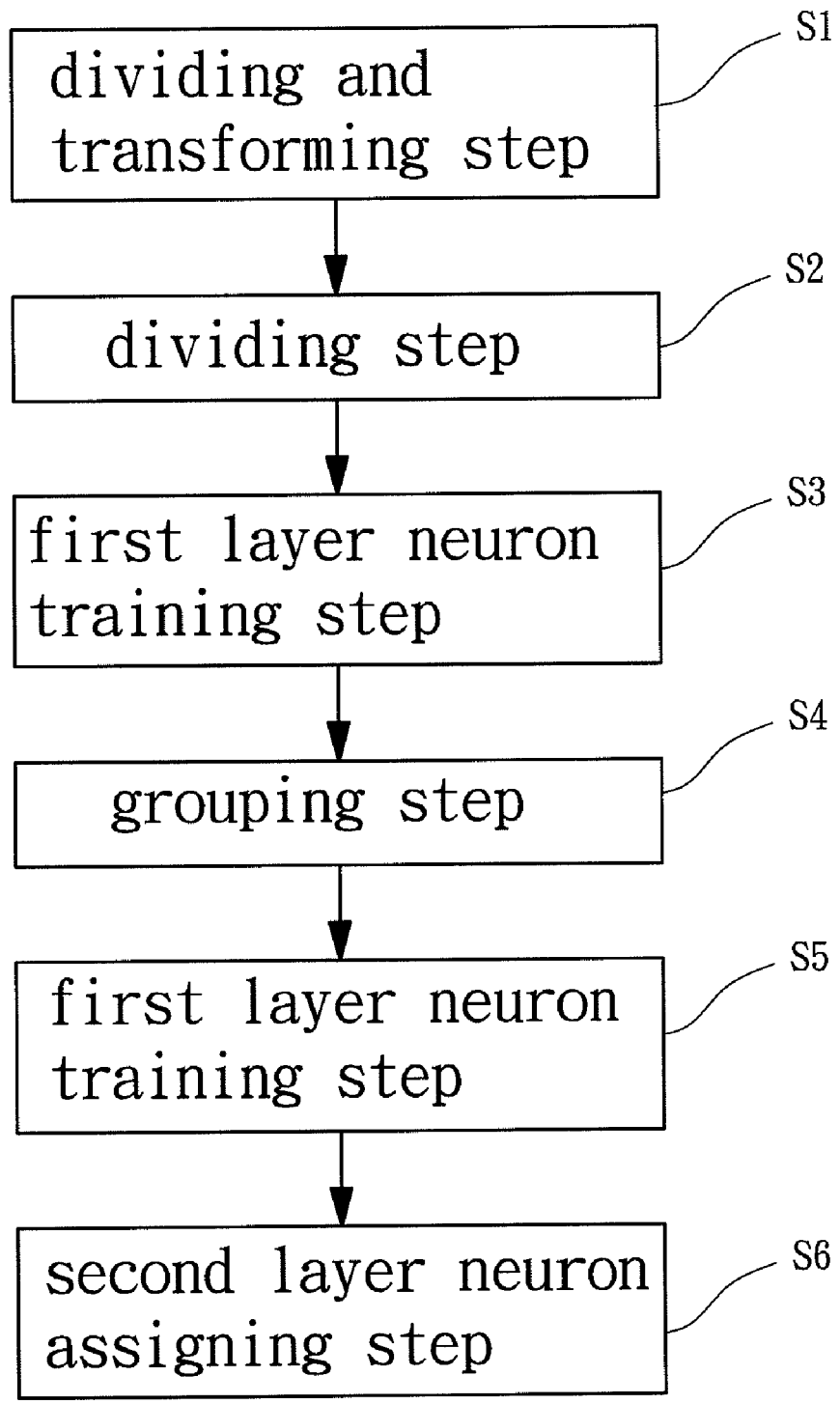
FIG. 2 shows a flowchart of a codebook generating method according to the invention.

Referring to FIG. 2, a codebook generating method of the invention comprises a dividing and transforming step S1, a dividing step S2, a first layer neuron training step S3, a grouping step S4, a second layer neuron assigning step S5 and a second layer neuron training step S6.

Referring to FIG. 2, the proposed codebook generating method is executed under a computer system in connection to at least a database having at least an original image consisting of a plurality of pixels.

Figure 3:
FIG. 3 shows a distribution of original vectors generated by the proposed codebook generating method.

Referring to FIGS. 2 and 3, the dividing and transforming step S1 is provided to divide the original image into a plurality of original blocks and transform the original blocks into a plurality of original vectors 11. For instance, if the original image has a size of 512 by 512, the original image may be divided into 16384 original blocks, with each original block having a size of 4 by 4 and containing 16 pixels. Following, all pixels in each original block is converted into an original vector 11 to be stored in the database.

Figure 4:
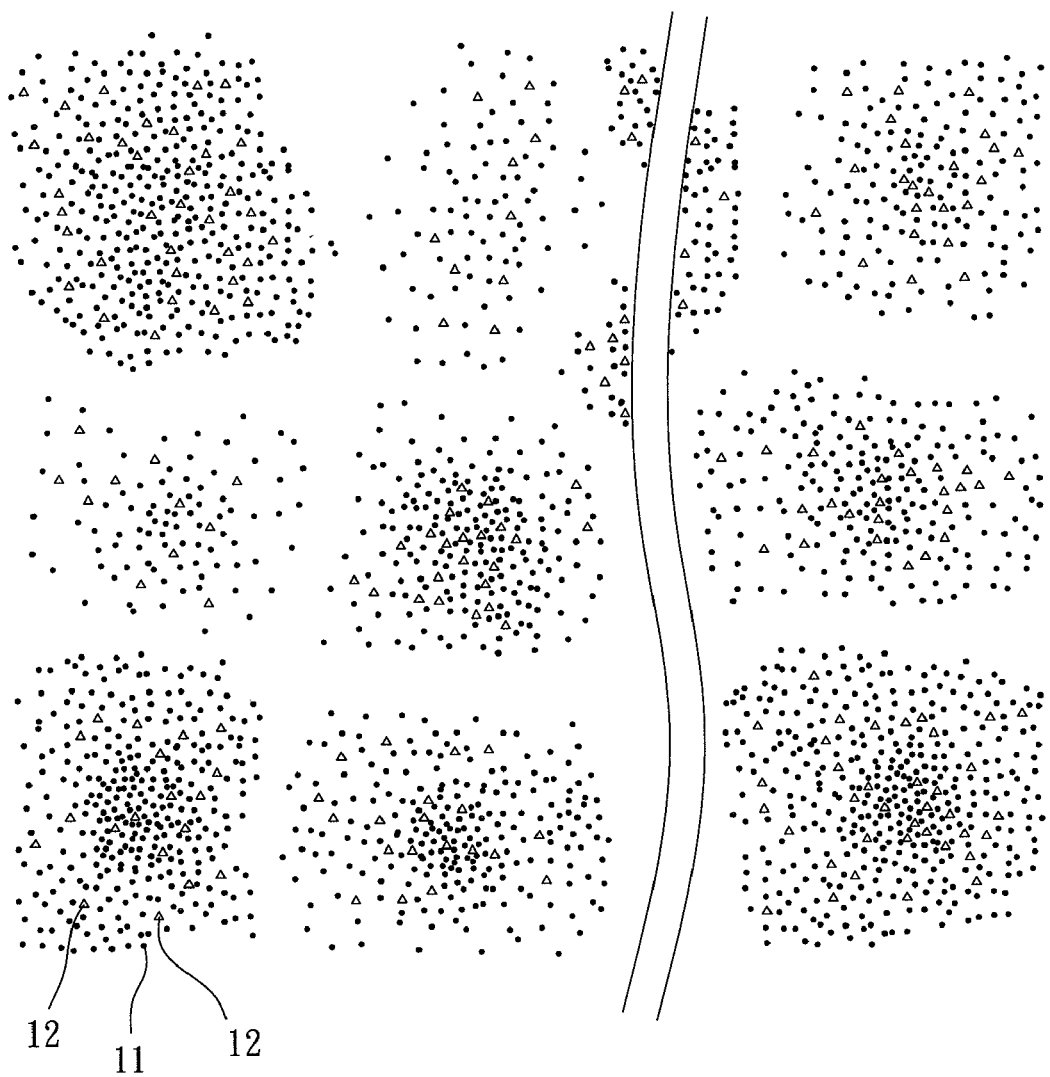
FIG. 4 shows a diagram of a dividing step of the proposed codebook generating method.

Referring to FIGS. 2 and 4, the dividing step S2 is provided to group the original vectors 11 using a grouping algorithm in order to obtain a plurality of centroids 12. Through the centroids 12 obtained, the step reduces the number of original vectors 11 requiring processing. Specifically, the grouping algorithm in the embodiment may be the LBG algorithm illustrated below in detail.

A first step of the LBG algorithm is to set a number of groups for grouping. For example, the number of K is set as 256 in the embodiment. A second step of the LBG algorithm is to randomly select 256 vectors from the original vectors 11, with the locations of the 256 selected original vectors 11 serving as initial locations of the centroids 12. A third step of the LBG algorithm is to calculate a Euclidean distance between each original vector 11 and centroid 12 so that each original vector 11 may be assigned to a corresponding centroid 12. A fourth step of the LBG algorithm is to determine a central centroid of the original vectors 11 in each group and the determined central centroid is treated as a new centroid. A fifth step of the LBG algorithm is to calculate a distortion indicative of a difference between the new centroid and the old centroid 12. If the calculated distortion is not smaller than the value of the distortion index $\epsilon$, the third step is repeated. If the calculated distortion is smaller than the value of the distortion index $\epsilon$, the whole training procedure is terminated and 256 centroids 12 are finally obtained. The distortion is calculated based on Mean Square Error (MSE) as indicated in a formula (a) below:

$$MSE = \frac{1}{W \times H} \sum_{x=1}^{W} \sum_{y=1}^{H} [i(x, y) - \hat{i}(x, y)]^2 \qquad (a)$$

In the formula (a) above, W represents a width of the original image and H represents a height of the original image. In addition, the parameter $i(x, y)$ represents a bit depth of a $(x, y)^{th}$ pixel in the original image, whereas the parameter $\hat{i}(x, y)$ represents the bit depth of the $(x, y)^{th}$ pixel in a compressed image. Based on this, the parameter $i(x, y) - \hat{i}(x, y)$ represents the difference of the bit depth of the $(x, y)^{th}$ pixel. The MSE formula for the $(x, y)^{th}$ pixel is performed twice to obtain MSE(t) and MSE(t+1). Based on this, a variation of an averaged distortion $$\Delta MSE = \frac{MSE(t) - MSE(t+1)}{MSE(t)}$$

may be further determined. If the determined ΔMSE is larger than a predetermined convergence threshold, the calculation proceeds to a next round of iteration. If the determined ΔMSE is not larger than the predetermined convergence threshold, the calculation is terminated. In the embodiment, the predetermined convergence threshold of the LBG method is set as 0.01. Based on this, the massive original vectors 11 may be reduced to the number of the 256 centroids 12. Subsequently, the centroids 12 are treated as virtual samples for later trainings. Thus, the calculation time is significantly reduced.

The following procedures of the invention are to improve upon the conventional HSOM method. For example, assume that the desired codebook is 1024 in size. Based on the assumption, as described in the related art, the number 1024 is equal to 32 by 32. Therefore, the number of the first-level neurons is determined to be 32 and the number of the second-level neurons in each group is also determined to be 32 in the conventional HSOM method. The number of the first-level neurons is set the same as that of the second-level neurons so that the determined result is easy to fall in local optimal solution. As a result, the real distribution of the input samples is not obtained in accuracy. In contrast, the number of the first-level neurons is set larger than that of the second-level neurons in the invention. For example, the number 1024 may be read as 128 by 8; therefore, the number of the first-level neurons is set as 128, whereas the number of the second-level neurons is set as 8. By setting the number of the first-level neurons different from that of the second-level neurons, the invention may avoid the determined result to fall in the local optimal solution. The subsequent procedures are illustrated below.

Figure 5:
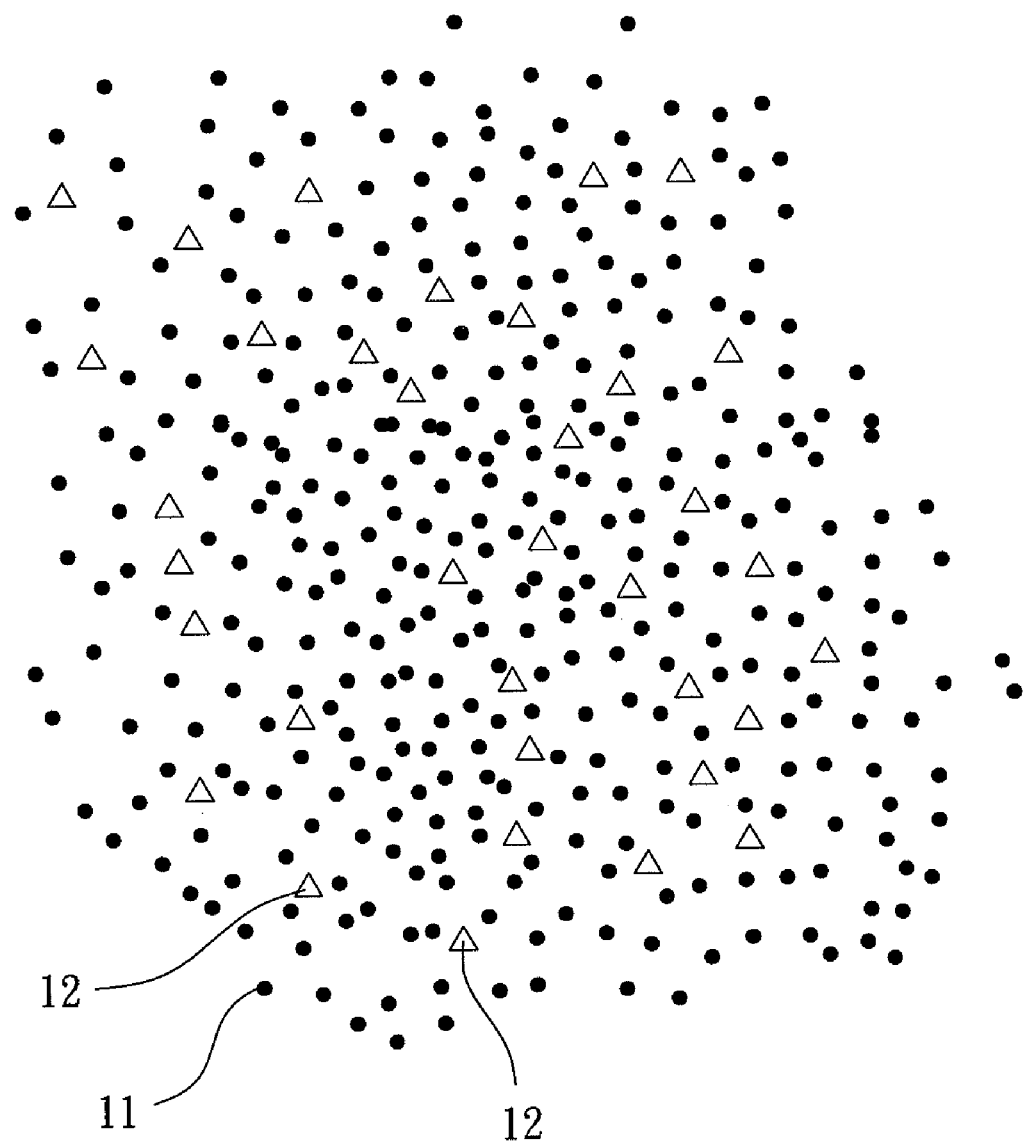
FIG. 5 shows a partially enlarged drawing after the dividing step of the proposed codebook generating method.
Figure 6:
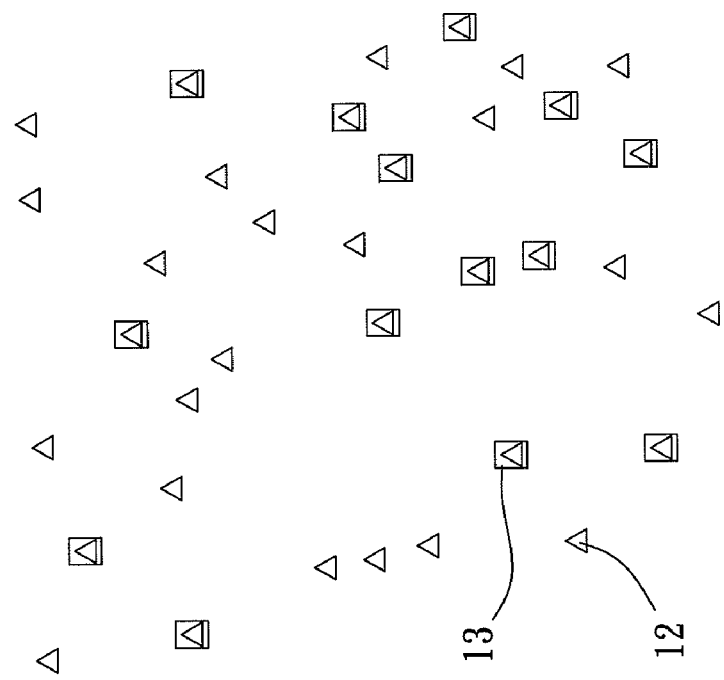
FIG. 6 shows a training diagram of a first-level neuron according to the proposed codebook generating method.

Referring to FIGS. 2, 5 and 6, the first layer neuron training step S3 in the invention is to select a portion of the centroids 12 as first-level neurons 13. Following, all the centroids 12 are used as samples for training the first-level neurons 13 based on the SOM method. In continuation of the above example, 128 out of the 256 centroids 12 are randomly selected as initial locations of the first-level neurons 13. Following, the 256 centroids 12 are used as samples for training the first-level neurons 13 based on the SOM method. The SOM method in the embodiment is described in detail below.

Figure 7:
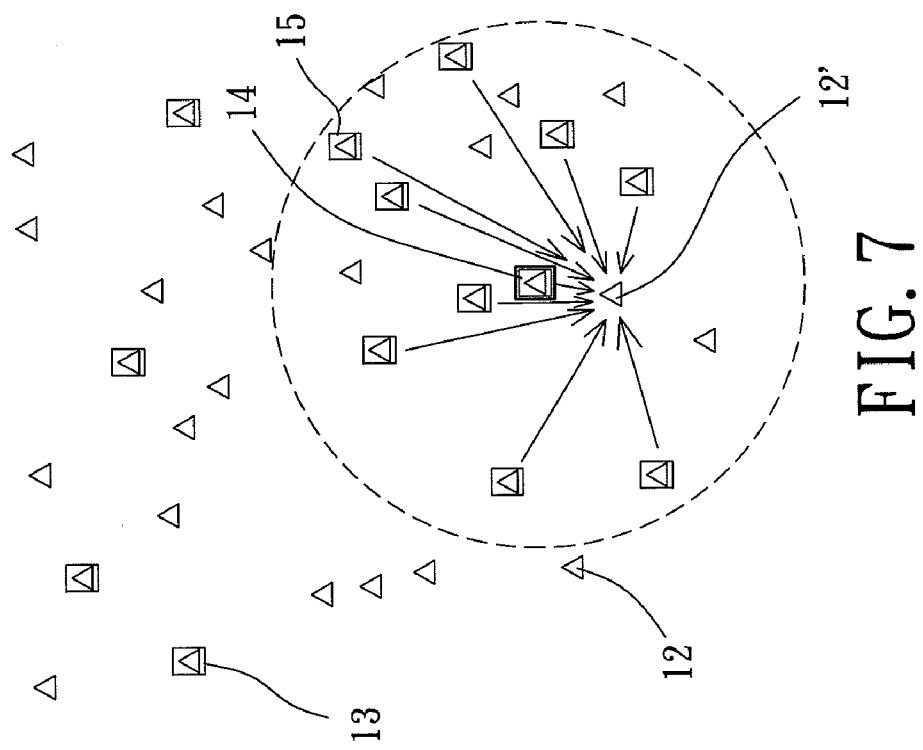
FIG. 7 shows a diagram of a first layer neuron training step of the proposed codebook generating method performing a SOM algorithm.

Firstly, as shown in FIG. 7, a first step of the SOM method is to calculate a Euclidean distance between one of the centroids 12 (defined as centroid 12') and each first-level neuron 13 (the number of the first-level neurons 13 is 128 in this example) based on the following formula (b). Then, the first-level neuron 13 with shortest distance to the centroid 12' is defined as a winning neuron 14. The formula (b) is listed as follows:

$$w_n^* = \underset{n}{\operatorname{argmin}} \| y_m - w_n(t) \|, n = 1, 2 \ldots N, \tag{b}$$

wherein $w_n^*$ is the winning neuron 14; $y_m$ is the location of a $m^{th}$ centroid 12, wherein m=1, 2 ... k; $w_n(t)$ is the location of a first-level neuron 13 during a $t^{th}$ training.

Note a circular neighboring range centered at the winning neuron 14 with a radius R is defined. In addition, the first-level neurons 13 located in the circular neighboring range are defined as neighboring neurons 15.

Following, a second step of the SOM method is to adjust the locations of the winning neuron 14 and the neighboring neurons 15 based on a formula (c) below:

$$w_n(t+1) = w_n(t) + \eta(t) \times \exp(-(r/R)) \times [y_m - w_n(t)] \tag{c}$$

Wherein $\eta(t)$ is a training rate during the $t^{th}$ training; r is a relative location of the first-level neuron 13, which is represented by $r: \|n-n^*\|$; R is the radius of the circular neighboring range. Note $n^*$ is the location of the winning neuron 14 and n is the location of a first-level neuron 13 within the circular neighboring range. In the embodiment, $\eta(0)=1$ and $R=\sqrt{N}$.

In the following, the first and second steps of the SOM method are repeated until all the centroids 12 finish the calculation of Euclidean distance.

Following, a third step of the SOM method is to update the radius R and the training rate $\eta(t)$. Wherein, $R(t+1)=R(t)\times 0.95$; if $R(t+1)<0.1$, then $R(t+1)=0.1$. In addition, $\eta(t+1)=\eta(t)\times 0.975$; if $\eta(t+1)<0.01$; then $\eta(t+1)=0.01$.

Finally, a fourth step of the SOM method is to determine whether an averaged distortion rate of trainings is larger than a threshold value. If so, the first to third steps of the SOM method are repeated. If not, the SOM method is terminated. The averaged distortion rate is calculated according to the following three formulas:

Firstly, a total distance between all samples and their corresponding neurons is calculated using a formula (d) below:

$$d = \sum_{i=1}^{n} \sum_{r=1}^{4\times 4} (x_{ir} - c_r)^2 \tag{d}$$

In formula (d) above, d is the total distance between all samples and their corresponding neurons; $x_{ir}$ represents an $i^{th}$ sample and $r^{th}$ dimension; $c_r$ is the location of a neuron corresponding to the $i^{th}$ sample. An averaged distortion is determined by dividing the total distance by the number of samples based on a formula (e) below:

$$\overline{D}(t+1) = \frac{\sum_{x \in X} d(x, \alpha(x))}{\text{x\_num}} \tag{e}$$

Then, the averaged distortion rate is determined according to a formula (f) below:

$$\Delta \overline{D} = \frac{\overline{D}(t) - \overline{D}(t+1)}{\overline{D}(t)} \tag{f}$$

Based on the formula (f), it can be determined that whether the averaged distortion rate is larger than the threshold value. In this embodiment, the threshold value is set as 0.000001.

The adapted SOM method of the invention is differed from the conventional SOM method by that the conventional SOM method is terminated when a predetermined number of times of iteration is achieved. Therefore, time consumption is increased. On the other hand, the invention determines whether to finish the trainings based on the averaged distortion rate. Therefore, the trainings of the invention may be adjusted based on different samples, avoiding the time waste. However, to avoid massive calculations when the threshold value is set too low, the number of times of iterations may be set. For example, the number of times of iterations may be set as 500. In this case, the training of SOM method is also terminated when 500 times of trainings are reached even though the averaged distortion rate has not yet reached the threshold value. The first layer neuron training step S3 is completed so far.

Figure 8:
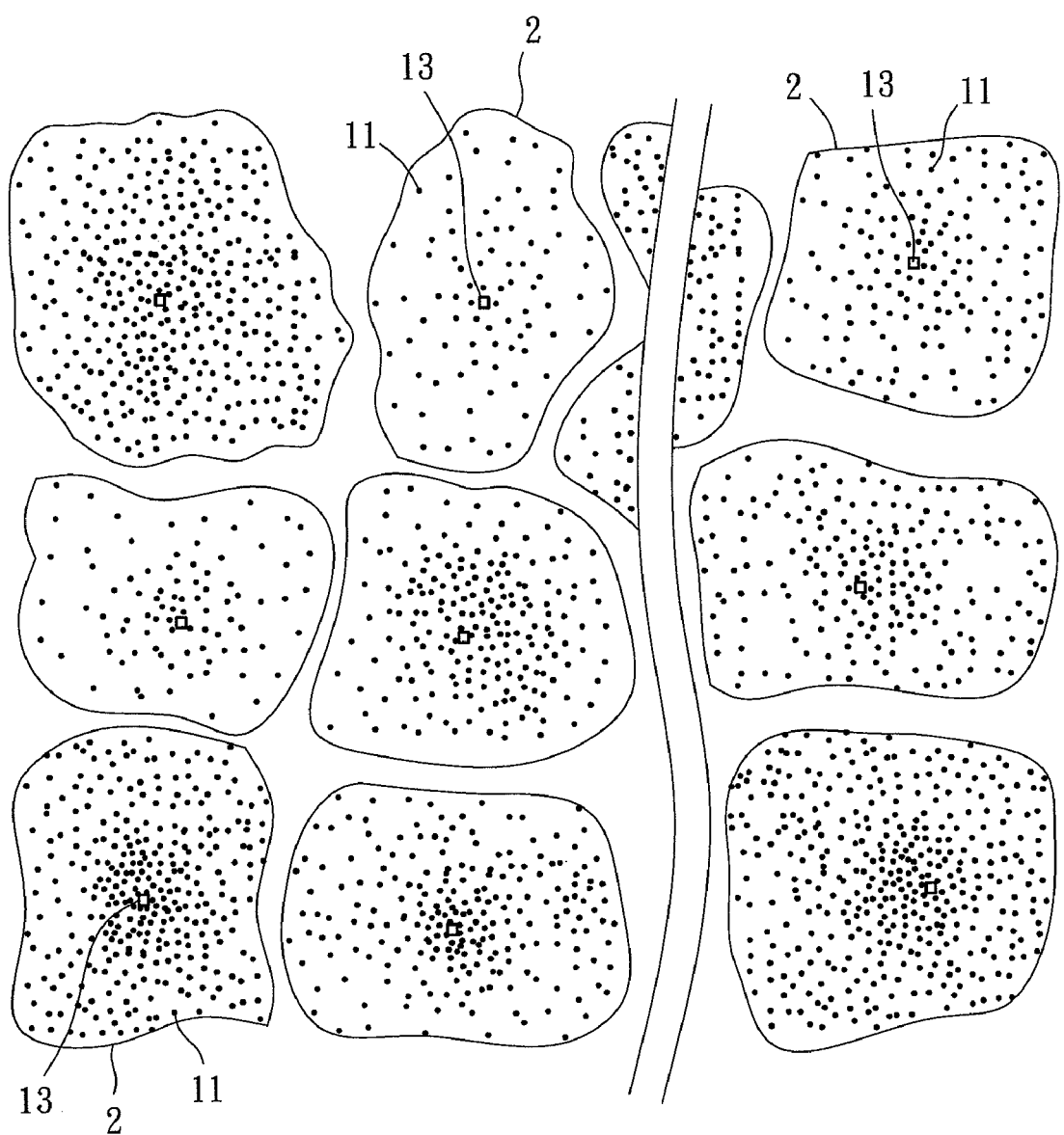
FIG. 8 shows a diagram of a grouping step according to the proposed codebook generating method.

Referring to FIGS. 2 and 8, the grouping step S4 is to assign each original vector 11 to a closest first-level neuron 13 in order to obtain a plurality of groups 2. Specifically, a Euclidean distance between each original vector 11 and first-level neuron 13 is calculated and each original vector 11 is assigned to a closest first-level neuron 13. For example, in continuation of the above example, the number of the first-level neurons 13 is 128; therefore, the original vectors 11 may be grouped into 128 groups 2.

Figure 9:
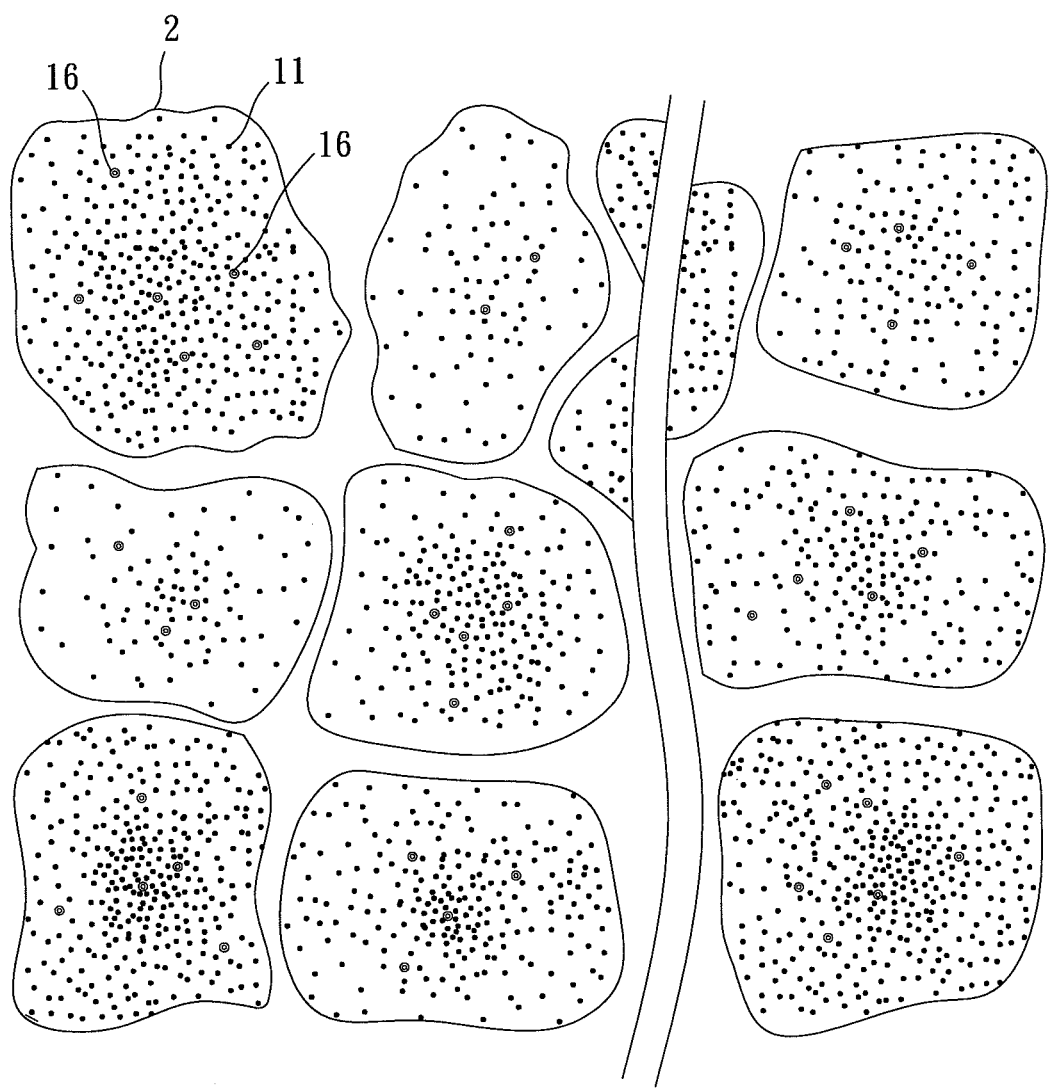
FIG. 9 shows a training diagram of a second-level neuron according to the proposed codebook generating method.

Referring to FIGS. 2 and 9, the second layer neuron assigning step S5 of the invention is to assign the number of second-level neurons 16 in each group 2 based on a distortion rate of the original vectors 11 in each group 2 and to select a portion of the original vectors 11 in each group 2 as the second-level neurons 16 based on the assignment. Specifically, in continuation of the above example, if the codebook of the invention is 1024 in size and the number of the first-level neurons 13 is 128, the number of the second-level neurons 16 in each group 2 should be 8. However, the number of the original vectors 11 in each group 2 is different. Therefore, the group 2 with more original vectors 11 should be assigned with more second-level neurons 16 for training purpose so that the distribution of the original vectors 11 can be presented more accurately. Thus, the assignment of the second-level neurons 16 in this embodiment is determined according to the distortion ratio of each group 2. This is achieved by firstly determining the total distance between all samples (original vectors 11) and their corresponding centroid in each group 2 using the formula (d) above, and then determining the number of the second-level neurons 16 that should be assigned to each group 2 using a formula (g) below:

$$N_g = \left[ \frac{d_g}{\sum d_g} \times \text{codebook\_size} \right] \quad (g)$$

Wherein, the variant codebook_size is the size of the codebook. If the determined $N_g$ is zero, the number of the second-level neurons 16 should be set as 1. In the formula (g) above, g represents a $g^{th}$ group; the bracket "[ ]" represents a round off operation. In this way, more second-level neurons 16 may be assigned to a group 2 with larger total distance. Thus, the assignment of the second-level neurons 16 may be based on the samples contained in the groups 2.

Referring to FIGS. 2 and 9 again, in the second layer neuron training step S6, the original vectors 11 in each group 2 are treated as samples and the second-level neurons 16 in each group 2 are trained using the SOM method. Accordingly, final neurons are obtained and the vectors corresponding to the final neurons are stored in a codebook. Specifically, the SOM method adapted in this step is the same as that used in the first layer neuron training step S3; both terminate the training procedures based on the same condition—namely, the averaged distortion rate. Therefore, the proposed method is more suitable for training the groups 2 with different number of the second-level neurons 16. This avoids wasting too much time on training the groups 2 with less number of the second-level neurons 16. The trained neurons obtained in the second layer neuron training step S6 are the final neurons, which is 1024 in number in continuation of the above example. The corresponding vectors of the 1024 final neurons are stored in a codebook. Thus, the whole procedure is accomplished.

The vectors contained in the codebook obtained via the above steps may be converted into a plurality of representative blocks, each having a corresponding code. In this way, the original blocks of the original image may be compared with the representative blocks and the codes of the most similar representative blocks may represent the original blocks and serve as indices. In this way, the codebook with a smaller volume may represent the original image for compression purpose.

On the contrary, during the decompression, the codebook is decoded by a decoding algorithm and a plurality of reconstructed blocks is obtained via the indices. The reconstructed blocks are then combined into a reconstructed image, thus accomplishing the decompression.

Referring to Table 1, 6 pictures are used to test the compression quality and compression time period of the invention. The 6 pictures are named Lena, Airplane, Boat, Peppers, Ann and Sweets, respectively. 30 rounds of calculations are taken to obtain an averaged result. The 6 pictures are 4 by 4 in blocks. Note the conventional HSOM method can not process the codebook with a size value that an integral value can not be obtained by taking a square root of the size value (such as 128 or 512). Therefore, some columns of the HSOM method do not have information and are thus marked as N/A (not available). A term PSNR (Peak Signal-to-Noise Ratio) is often used to evaluate the compression quality. The higher the PSNR is, the better the compression quality is. The formula of PSNR is listed below:

$$PSNR = 10 \log_{10} \frac{255^2}{MSE} \quad (h)$$

The formula of MSE may be referred to the formula (a) above.

In Table 1 below, LISA represents the proposed method. Based on the information in Table 1, the proposed codebook generating method (LISA) does improves upon the conventional LBQ 1D-SOM and HSOM in terms of PSNR (compression quality) or calculation time (time cost) or whatever.

TABLE 1

| Image | Codebook Size | PSNR (in dB) | | | | Time Cost (in second) | | | |
|---|---|---|---|---|---|---|---|---|---|
| | | LISA | LBG | 1D-SOM | HSOM | LISA | LBG | 1D-SOM | HSOM |
| Lena | 128 | 29.579 | 29.569 | 29.686 | N/A | 9.642 | 8.394 | 142.09 | N/A |
| | 256 | 30.671 | 30.468 | 30.589 | 30.636 | 12.085 | 16.693 | 283.42 | 56.080 |
| | 512 | 31.816 | 31.272 | 31.477 | N/A | 13.643 | 28.215 | 563.08 | N/A |
| | 1024 | 33.235 | 32.106 | 32.436 | 32.973 | 17.082 | 45.065 | 1118.3 | 113.79 |
| Airplane | 128 | 29.239 | 28.839 | 29.320 | N/A | 8.103 | 12.891 | 142.38 | N/A |
| | 256 | 30.284 | 29.615 | 30.211 | 30.224 | 10.476 | 20.234 | 281.88 | 56.336 |
| | 512 | 31.343 | 30.458 | 31.133 | N/A | 11.855 | 27.254 | 561.63 | N/A |
| | 1024 | 32.563 | 31.452 | 32.166 | 32.472 | 15.916 | 38.515 | 1124.9 | 114.91 |
| Boat | 128 | 29.157 | 29.132 | 29.345 | N/A | 8.556 | 14.178 | 141.94 | N/A |
| | 256 | 30.206 | 29.935 | 30.247 | 30.166 | 10.577 | 21.082 | 282.02 | 55.771 |

TABLE 1-continued

| Image | Codebook Size | PSNR (in dB) | | | | Time Cost (in second) | | | |
|---|---|---|---|---|---|---|---|---|---|
| | | LISA | LBG | 1D-SOM | HSOM | LISA | LBG | 1D-SOM | HSOM |
| | 512 | 31.304 | 30.754 | 31.222 | N/A | 12.400 | 30.458 | 562.50 | N/A |
| | 1024 | 32.518 | 31.643 | 32.284 | 32.455 | 16.456 | 42.124 | 1116.4 | 114.08 |
| Peppers | 128 | 29.701 | 29.674 | 29.787 | N/A | 9.489 | 9.019 | 142.58 | N/A |
| | 256 | 30.660 | 30.488 | 30.607 | 30.627 | 11.762 | 16.013 | 283.02 | 55.847 |
| | 512 | 31.620 | 31.223 | 31.396 | N/A | 13.708 | 26.168 | 564.28 | N/A |
| | 1024 | 32.672 | 31.985 | 32.308 | 32.573 | 17.975 | 38.181 | 1117.1 | 114.17 |
| Ann | 128 | 28.172 | 28.213 | 28.332 | N/A | 8.957 | 7.858 | 140.67 | N/A |
| | 256 | 29.249 | 29.183 | 29.339 | 29.254 | 11.423 | 14.782 | 284.75 | 55.674 |
| | 512 | 30.345 | 30.120 | 30.279 | N/A | 12.904 | 23.101 | 562.92 | N/A |
| | 1024 | 31.535 | 31.107 | 31.384 | 31.526 | 16.600 | 35.407 | 1115.9 | 113.84 |
| Sweets | 128 | 29.684 | 29.630 | 29.834 | N/A | 9.046 | 7.198 | 141.28 | N/A |
| | 256 | 30.847 | 30.641 | 30.853 | 30.822 | 11.263 | 12.171 | 281.53 | 56.072 |
| | 512 | 32.088 | 31.625 | 31.888 | N/A | 12.911 | 23.140 | 559.14 | N/A |
| | 1024 | 33.514 | 32.645 | 32.933 | 33.341 | 16.325 | 36.743 | 1117.6 | 114.29 |

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. A codebook generating method, comprising:
   a dividing and transforming step configured to divide an original image into a plurality of original blocks and transforming the original blocks into a plurality of original vectors;
   a dividing step configured to group the original vectors using a grouping algorithm so as to obtain a plurality of centroids;
   a first layer neuron training step configured to select a portion of the centroids as first-level neurons, wherein the centroids are used as samples for training the first-level neurons via a Self-Organizing Map (SOM) method;
   a grouping step configured to assign each of the original vectors to a closest first-level neuron so as to obtain a plurality of groups;
   a second layer neuron assigning step configured to assign a number of second-level neurons in each of the groups based on a distortion rate of the original vectors in each of the groups, and to select a portion of the original vectors in each of the groups as the second-level neurons based on the assignment, wherein the number of the second-level neurons is determined according to the following formula:

$$N_g = \left\lceil \frac{d_g}{\sum d_g} \times \text{codebook\_size} \right\rceil,$$

wherein is the total distance between all the original vectors in a gth group and a corresponding centroid of the gth group, and codebook_size is the size of the codebook; and
   a second layer neuron training step configured to define the original vectors in each of the groups as samples, train the second-level neurons in each of the groups using the SOM method to obtain a plurality of final neurons, and store vectors corresponding to the final neurons in a codebook.

2. The codebook generating method as claimed in claim 1, wherein the SOM method is terminated when an averaged distortion rate of trainings is smaller than a threshold value.

3. The codebook generating method as claimed in claim 2, wherein the threshold value is 0.000001.

4. The codebook generating method as claimed in claim 2, wherein the grouping algorithm is LBG algorithm.

5. A codebook generating method, comprising:
   a dividing and transforming step configured to divide an original image into a plurality of original blocks and transforming the original blocks into a plurality of original vectors;
   a dividing step configured to group the original vectors using a grouping algorithm so as to obtain a plurality of centroids;
   a first layer neuron training step configured to select a portion of the centroids as first-level neurons, wherein the centroids are used as samples for training the first-level neurons via a Self-Organizing Map (SOM) method;
   a grouping step configured to assign each of the original vectors to a closest first-level neuron so as to obtain a plurality of groups;
   a second layer neuron assigning step configured to assign a number of second-level neurons in each of the groups based on a distortion rate of the original vectors in each of the groups, and to select a portion of the original vectors in each of the groups as the second-level neurons based on the assignment; and
   a second layer neuron training step configured to define the original vectors in each of the groups as samples, train the second-level neurons in each of the groups using the SOM method to obtain a plurality of final neurons, and store vectors corresponding to the final neurons in a codebook,
   wherein the number of the first-level neurons is larger than that of the second-level neurons in each of the groups.

6. The codebook generating method as claimed in claim 5, wherein the SOM method is terminated when an averaged distortion rate of trainings is smaller than a threshold value.

7. The codebook generating method as claimed in claim 6, wherein the threshold value is 0.000001.

8. The codebook generating method as claimed in claim 6, wherein the grouping algorithm is LBG algorithm.

* * * * *